(12) United States Patent
Sherrets et al.

(10) Patent No.: US 9,483,652 B2
(45) Date of Patent: *Nov. 1, 2016

(54) ENABLING USER PRIVACY FOR CHANGES OF ACCESS TO SHARED CONTENT

(71) Applicant: Google Inc., Mountain View, CA (US)

(72) Inventors: Doug Sherrets, San Francisco, CA (US); Ajmal Arshan Asver, San Francisco, CA (US); Zach Yeskel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 331 days.

This patent is subject to a terminal disclaimer.

(21) Appl. No.: 14/145,193

(22) Filed: Dec. 31, 2013

(65) Prior Publication Data

US 2015/0186660 A1 Jul. 2, 2015
US 2016/0055341 A9 Feb. 25, 2016

Related U.S. Application Data

(63) Continuation of application No. 13/523,728, filed on Jun. 14, 2012, now Pat. No. 8,640,257.

(51) Int. Cl.
*G06F 21/60* (2013.01)
*G06F 17/30* (2006.01)

(52) U.S. Cl.
CPC ........... *G06F 21/606* (2013.01); *G06F 21/604* (2013.01); *G06F 2221/2141* (2013.01)

(58) Field of Classification Search
CPC .. G06F 21/6245; G06F 21/604; G06F 21/10; H04L 63/10; H04L 63/20
USPC ...................................................... 726/26–30
See application file for complete search history.

(56) References Cited

U.S. PATENT DOCUMENTS

| | | | |
|---|---|---|---|
| 7,844,604 B2 * | 11/2010 | Baio | G06Q 30/02 707/706 |
| 7,945,653 B2 | 5/2011 | Zuckerberg et al. | |
| 8,640,257 B1 * | 1/2014 | Sherrets | G06F 21/6245 707/732 |
| 2007/0266095 A1 | 11/2007 | Billsus et al. | |
| 2009/0324022 A1 | 12/2009 | Sangberg et al. | |
| 2010/0054600 A1 | 3/2010 | Anbalagan et al. | |
| 2011/0202968 A1 * | 8/2011 | Nurmi | G06F 21/10 726/1 |
| 2012/0246719 A1 * | 9/2012 | Bhamidipaty | H04L 63/0209 726/22 |
| 2012/0331568 A1 | 12/2012 | Weinstein et al. | |

* cited by examiner

*Primary Examiner* — Kambiz Zand
*Assistant Examiner* — Noura Zoubair
(74) *Attorney, Agent, or Firm* — IP Spring

(57) ABSTRACT

In one embodiment, a method for enabling user privacy for content on a network includes receiving input from a first user instructing at least one change in user access to shared content provided by a network system. The change modifies the user access from an existing set of one or more users of the network system to a different set of one or more users of the network system. The method checks a privacy setting associated with each of one or more referred users of the network system who are referred to by the shared content. The privacy setting indicates whether the associated referred user is to be sent a notification indicating that the at least one change in user access has been instructed.

20 Claims, 9 Drawing Sheets

ENABLING USER PRIVACY FOR CHANGES OF ACCESS TO SHARED CONTENT

BACKGROUND

Social network systems and services have become increasingly popular for use over wide-area computer networks such as the Internet. A user of a social network system can upload and post content which can become shared by allowing one or more users of the system to access the content. A user can specify which set of users has access to the shared content. For example, a photograph can be posted which can be accessed by a set of users defined by the user, such as "friends" of the user as designated in a user group (e.g., "friends list" or "circle") on the social network system. Furthermore, users can add descriptions or comments to content, such as tags. These tags can name, identify or otherwise refer to other users of the social network system. In addition, a user may change which users have access to the shared content. For example, the user may change user access from a particular user group to general public access that includes all users of the system.

SUMMARY

Embodiments of the present application relate to enabling user privacy for changes of access to shared content. In some embodiments, a method for enabling user privacy for content on a network includes receiving input from a first user instructing at least one change in user access to shared content provided by a network system. The change modifies the user access from an existing set of one or more users of the network system to a different set of one or more users of the network system. The method checks a privacy setting that is associated with each of one or more referred users of the network system who are referred to by the shared content. The privacy setting indicates whether the associated referred user is to be sent a notification indicating that the at least one change in user access has been instructed.

In various embodiments of the above method, the existing set of users can be a first predetermined user group associated with the first user and the different set of users can be a second predetermined user group associated with the first user. The existing set of users can be a first designated user access level and the different set of users can be a second designated user access level. The existing set of users can include a smaller number of users of the network than the different set of users, or a larger number of users. The existing set of users can be a first linked level of users including only users having a social link to the first user, and the different set of users can include the first linked level users and one or more extended linked levels of users having a social link to the first linked level users.

The notification can be sent to each of the referred users who have a privacy setting requiring the notification. The notification can be sent to each of the referred users when the access change matches one or more corresponding predetermined conditions for each of the referred users to be notified as specified in privacy settings, such as a condition that the change in access is made to designated user groups or users of the network system. A prompt can be sent to the one or more notified referred users, the prompt requesting that the one or more notified referred users provide at least one permission to allow the at least one change in user access to the shared content. In response to receiving a denial of permission to the change in access from one or more referred users, the at least one change in access is not performed, or the change in access is performed except for identifications of the denying referred users in the shared content, or an identification of the denying referred users is removed from the shared content. The prompt can allow the referred users to each specify a different change in user access to the shared content than the instructed change in user access. The referred users can be identified in the shared content by at least one tag viewable by users having access to the shared content. The shared content can include a photo, text, a video, an audio recording, or an indication of a physical location of the one or more referred users. In one embodiment, a suggested change in user access is received from at least one of the referred users prompted for permission, where the suggested change is sent to at least one of the referred users with a request for permission to allow the suggested change.

In some embodiments, a method for enabling user privacy for content on a network includes providing shared content contributed by a first user, where the shared content is stored by a social network system and is made accessible to an existing set of other users of the social network system. One or more referred users of the network system are identified by the shared content. Input is received from the first user instructing at least one change in user access to the shared content. The change modifies the user access from the existing set of other users of the social network to a different set of users of the social network system. The method includes checking privacy settings associated with each of the referred users identified by the shared content, where the privacy settings indicate whether the associated referred user is to be sent a notification indicating that the at least one change in user access has been instructed. The privacy settings also indicate whether the associated referred user is to be sent a prompt requesting that the associated referred user provide a permission to allow the at least one change in user access to be performed. The notification is sent to each of the referred users who are associated with corresponding privacy settings requiring the notification. A prompt is sent to each of the referred users who are associated with privacy settings requiring the prompt. The user access is changed to the different set of users of the social network system in response to receiving the at least one permission from the prompted referred users.

In some embodiments, a system for enabling user privacy for shared content includes a storage device storing shared content, and at least one processor accessing the storage and operative to perform operations. The operations include receiving input from a first user instructing at least one change in user access to the shared content, where the at least one change modifies the user access from an existing set of one or more users of a network system to a different set of one or more users of the network system. The operations also include checking a privacy setting associated with each of one or more referred users of the network system who are referred to by the shared content. The privacy setting indicates whether the associated referred user is to be sent a notification indicating that the at least one change in user access has been instructed.

Some embodiments of the system can include the processor performing operations including sending the notification to each of the referred users having a privacy setting requiring the notification, and sending a prompt to the notified referred users. The prompt can request that the notified referred users provide at least one permission to allow the at least one change in user access to the shared content. The prompt can allow the referred users to each specify a different change in user access to the shared content than the instructed change in user access. In some embodiments, the notification can be sent to each of the referred users when the access change matches one or more corresponding predetermined conditions for each of the referred users to be notified as specified in privacy settings, such as a condition that the change in access is made to designated user groups or users of the network system.

DETAILED DESCRIPTION

One or more embodiments described herein relate to enabling user privacy for changes to access of shared content on network systems such as social networks. For example, after a user instructs to change user access to shared content, the system can notify other users who are identified or otherwise referred to in that shared content, and in some embodiments can request the permission of those referred users to change the user access.

A user may have an issue with shared content on a network system if, for example, the content is changed to have a different user access. For example, the user access may be changed from a smaller set of friends to broader user access level, such as the general public. Embodiments described herein can enable privacy or other user control to users referred to in shared content. If user access to the shared content is changed, the referred users are notified. Furthermore, the referred users can be prompted for their permission to change the user access. Various options allow users to customize under which access change conditions they are notified and/or prompted. The referred users thus can be aware of and/or control the extent to which the referred content is viewed or otherwise accessed by users of the social network system as that user access is changed over time. These features enable a user to customize how information about the user is distributed and publicized to other users of a network system.

Methods and systems are described herein associated with particular implementations. However, one of ordinary skill in the art will recognize that these methods and systems will operate effectively in other implementations.

Figure 1:
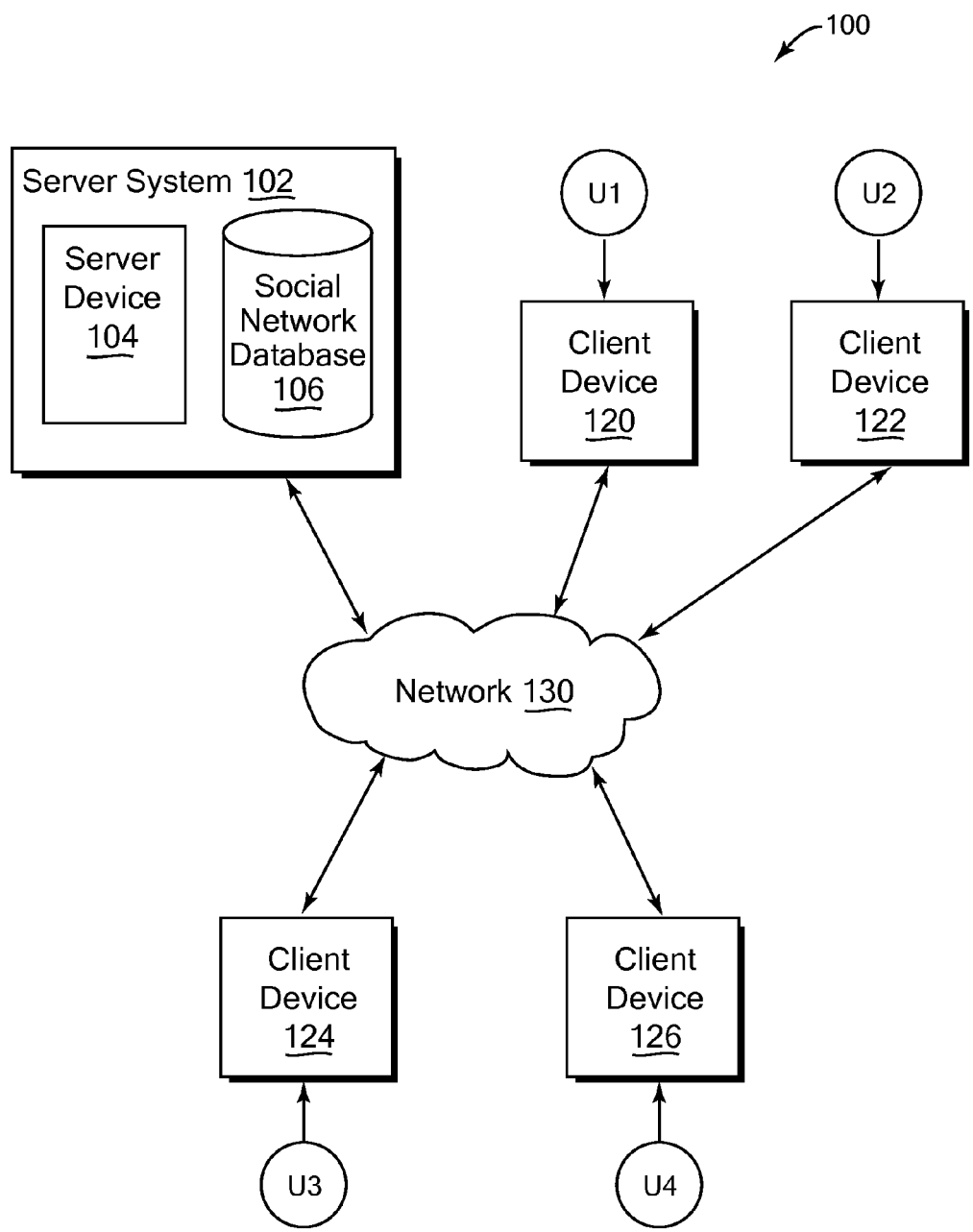
FIG. 1 is a block diagram of an example network environment which may be used for one or more embodiments described herein.

FIG. 1 illustrates a block diagram of an example network environment 100, which may be used in some embodiments to implement one or more features described herein. In some embodiments, network environment 100 includes one or more server systems, such as server system 102 in the example of FIG. 1. Server system 102 can communicate with a network 130, for example. Server system 102 can include a server device 104 and a social network database 106 or other storage device. Network environment 100 also includes one or more client devices, such as client devices 120, 122, 124, and 126, which may communicate with each other via network 130 and server system 102. Network 130 can be any type of communication network, including one or more of the Internet, local area networks (LAN), wireless networks, switch or hub connections, etc.

For ease of illustration, FIG. 1 shows one block for server system 102, server device 104, and social network database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, social network database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, TV set top box or entertainment device, personal digital assistant (PDA), media player, game device, etc. In other embodiments, network environment 100 may not have all of the components shown and/or may have other elements including other types of elements instead of, or in addition to, those described herein.

In various embodiments, end-users U1, U2, U3, and U4 may communicate with each other using respective client devices 120, 122, 124, and 126, and respective to features described herein each user can receive messages and notifications via a social network system implemented by network system 100. In one example, users U1, U2, U3, and U4 may interact with each other via the social network system, where respective client devices 120, 122, 124, and 126 transmit communications and data to one or more server systems such as system 102, and the server system 102 provides appropriate data to the client devices such that each client device can receive shared content uploaded to the social network system via the server system 102.

The social network system can be any system allowing users to perform a variety of communications, form links and associations, upload and post shared content, and/or perform other socially-related functions. For example, the social network system can allow a user to send messages to particular or multiple other users, form social links in the form of associations to other users within the social network system, group other users in user lists, friends lists, or other groups, post content including text, video sequence, audio sequence or recording, or other types of content for access by designated sets of users of the social network system, send multimedia information and other information to other users of the social network system, participate in live video, audio, and/or text chat with other users of the system, etc. As used herein, the term "social network system" can include a software and/or hardware system that facilitates user interactions, and can include a service implemented on a network system. A "social link" is any link between multiple users that allows these users to more easily communicate, view and find statuses of the other users, and/or otherwise relay information between each other. For example, adding another user to a first user's group of known users is adding a social link between these users. In some embodiments, a "user" can include one or more programs or virtual entities, as well as persons that interface with the system or network.

Furthermore, a user can designate one or more user groups, such as "friends lists" or "circles," to allow users in the designated user groups to access or receive information associated with the user on the social network system. A user's user groups each specify one or more users of the social network system with which the user has a social link. For example, the user can designate that the users in one user group can access content (e.g., receive and view the content on their client devices) which the user posts on the social network system, such as text or audio messages and graphical images. Or, the user can designate that the users in a different user group can access user profile information of the user, such as identifying information, opinions, hobbies, interests, etc. In some embodiments, the access of users to user information can be designated in terms of larger groups, such as a "public" setting designating all the users of the social network system. Some embodiments of social network systems allow the user to designate groups of users including extended or additional social linked levels (degrees of separation) of users. For example, a first user may be able to designate that a second or extended linked level of users, such as friends of the user's friends, are able to access the first user's information and content, which in this example can be any users that have at least one of the friends of the first user in their own user groups. A user may also be able to designate other groups or sets of users regardless of whether those other users are in the user's own listed groups. For example, the user may designate users belonging to a designated group, list, or circle, or having one or more specified characteristics, such as age, membership in a designated organization, eye color, designated hobbies or interests, member of a designated organization since a particular time or date, etc.

Respective to features described herein, each user can set privacy settings in his or her account or user profile to determine whether and how notifications and or prompts for permission are sent to the user when content that refers to the user is changed for user access, such as changed in user access level or privacy level. A social networking interface, including privacy settings, notifications, prompts, and other features described herein, can be displayed using software on the client device, such as application software or client software in communication with the server system. The interface can be displayed on an output device of the client device, such as a display screen. For example, in some embodiments the interface can be displayed using a particular standardized format, such as in a web browser or other application as a web page provided in Hypertext Markup Language (HTML), Java™, JavaScript, Extensible Markup Language (XML), Extensible Stylesheet Language Transformation (XSLT), and/or other format.

Other embodiments can use other forms of network systems instead of social network systems. For example, a set of users using any computer network can make use of features described herein.

Figure 2:
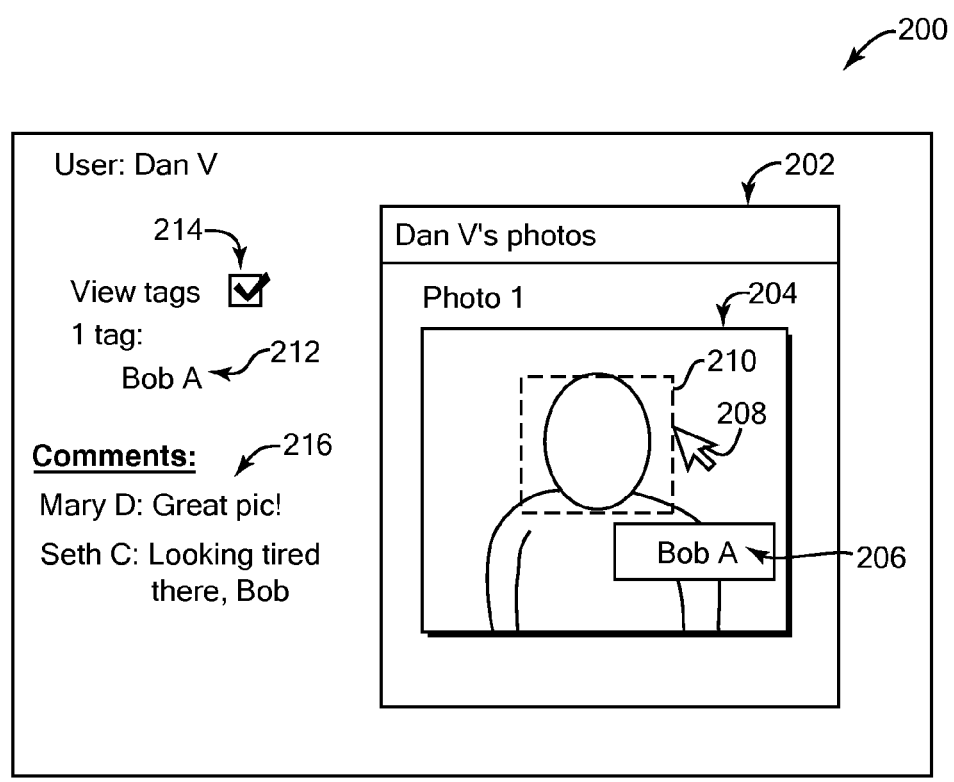
FIG. 2 is illustration of an example graphical user interface (GUI) displaying content uploaded to a network system according to one embodiment.

FIG. 2 is a diagrammatic illustration of an example simplified graphical interface (GUI) 200 displaying content uploaded to a network system according to one embodiment. GUI 200 can be displayed on a display device, e.g., of a client device 120, 122, 124, and/or 126, or a server system 102 in some embodiments. For example, the GUI 200 can be downloaded from the server system 102 for display on a client device in a web browser or other application program. The interface 200 includes one or more displayed windows within the GUI, or can be displayed in other forms in other interfaces.

In one embodiment, GUI 200 includes a content window 202, which in the described example of FIG. 2 shows a user's content in the form of photos. The user "Dan V" has uploaded the photo 204 to his account or user profile of the social networking system implemented on server system 104. In this example, the photo 204 depicts another user of the social networking system. The uploading user has added referring information to the photo 204, which in this example identifies the depicted user in the form of a tag that includes the name of the user depicted, "Bob A." For example, the tag can be displayed as tag 206 when the user viewing the GUI 200 moves a cursor 208 over a selection area 210 defined within the photo 204. The tag can also be displayed as text 212 to the side of the photo 204 if the viewing user has selected the option 214 to view tags there. Various other embodiments can display tags or other referring information in other forms. In some embodiments, the displayed tag 206 and/or 212 can also be links to the tagged user's profile or information. This allows the user to select one of the tags 206 and 212 to cause the tagged user's profile or other information about the tagged user to be displayed. The referred user in photo 204 can be referred to in other ways in other embodiments.

GUI 200 can also display other information related to the displayed content 204. For example, in some embodiments user comments 216 can also be displayed, which are comments contributed by one or more users of the social network system. The comments can also include referring information that may identify or otherwise refer to another user of the social network system, and in some embodiment can include a link to referred user's profiles or information. Such comments, ratings, or other added information can be considered part of the shared content that also includes base content 204 which is the uploaded photo.

Figure 3:
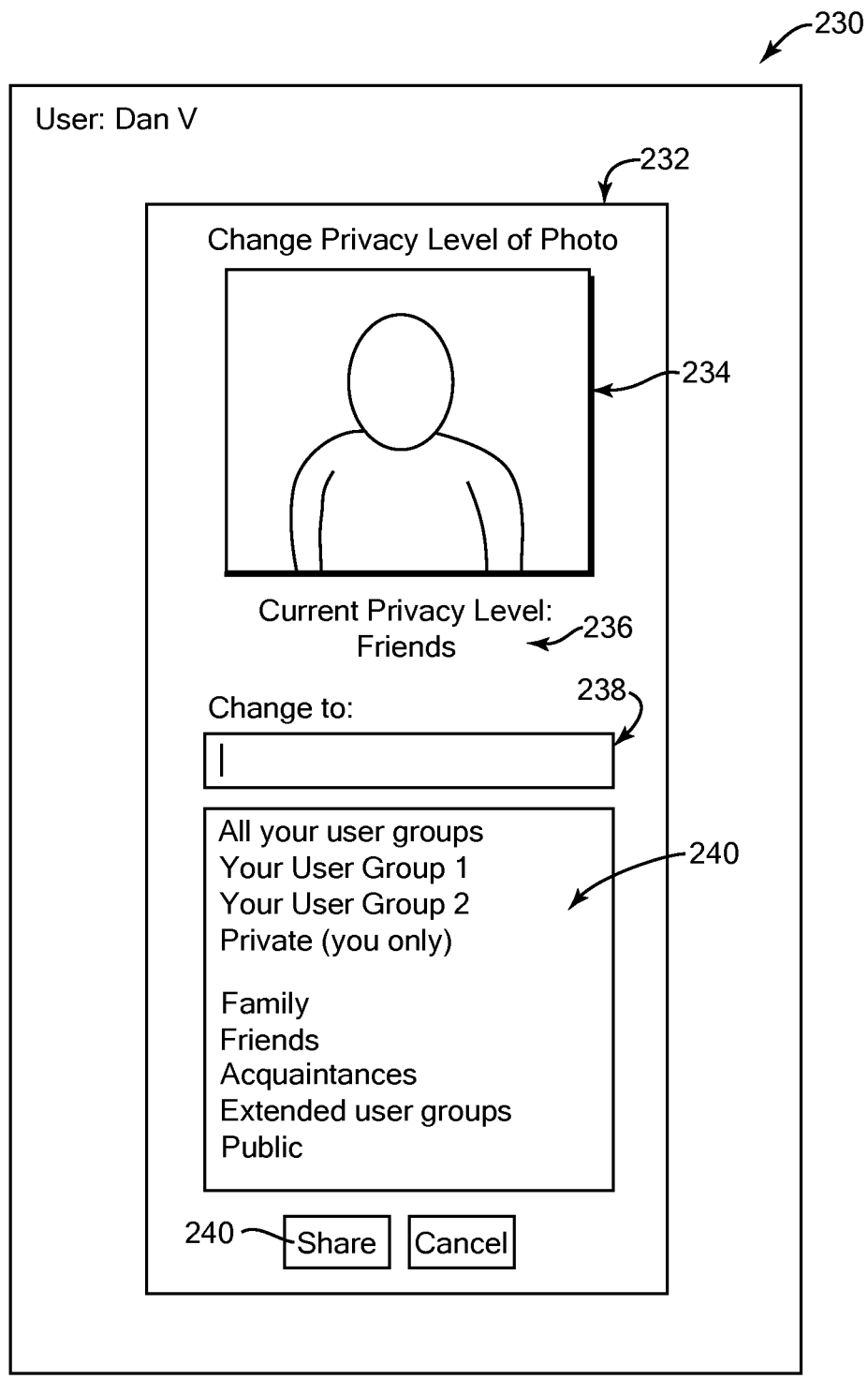
FIG. 3 is a diagrammatic illustration of an example simplified GUI allowing a user to change or set user access to shared content, according to one embodiment.

FIG. 3 is a diagrammatic illustration of an example simplified GUI 230 allowing a user to change or set a user access to shared content, according to one embodiment. GUI 230 can be part of the GUI 200 of FIG. 2, for example.

The interface 230 includes a displayed window 232 in one embodiment, in which selected content may have its user access changed. In this example, the photo 234 is displayed by the uploading user of that photo. Some embodiments can display an indication of a current or existing user access for the photo 234, which in this example is displayed as a designated user access level (or "privacy level") 236. The users in the "friends" group of the uploading user can access the photo, including viewing it, adding comments or other additional content to it (if permitted by the uploading user), etc. The uploading user can enter the new, desired user access level for the content in a field 238. In some embodiments, as shown, a menu 240 of some possible user access levels or options can be displayed from which the user can select. This example includes options such as "all your user groups," which allows the user to share the content with all the users in his user groups (such as circles, predefined friends lists, etc.). Or, the user can select a specific stored user group to which to provide user access such as User Group 1 or User Group 2. The user can also change the user access to "Private" in which only the user can access the content. Other options include changing the user access to categories having users defined in user groups or other accessible lists, for example, such as "family," "friends," or "acquaintances." The option of "extended user groups" can include users being two or more social linked levels away from the user. For example, these can be extended users who are in the user groups of friend users who are in the user groups of the selecting user. Some embodiments can also include a "public" option, which would provide access to all the users of the social network system.

Once the user has selected the desired privacy level, then a share control 242 can be selected by the user to set the new privacy level for the content. In some embodiments, there may be users referred to in the shared content who require approval before the shared content is changed to the new user access level, and so the content would not be immediately changed to the new privacy level in such embodiments.

Figure 4:
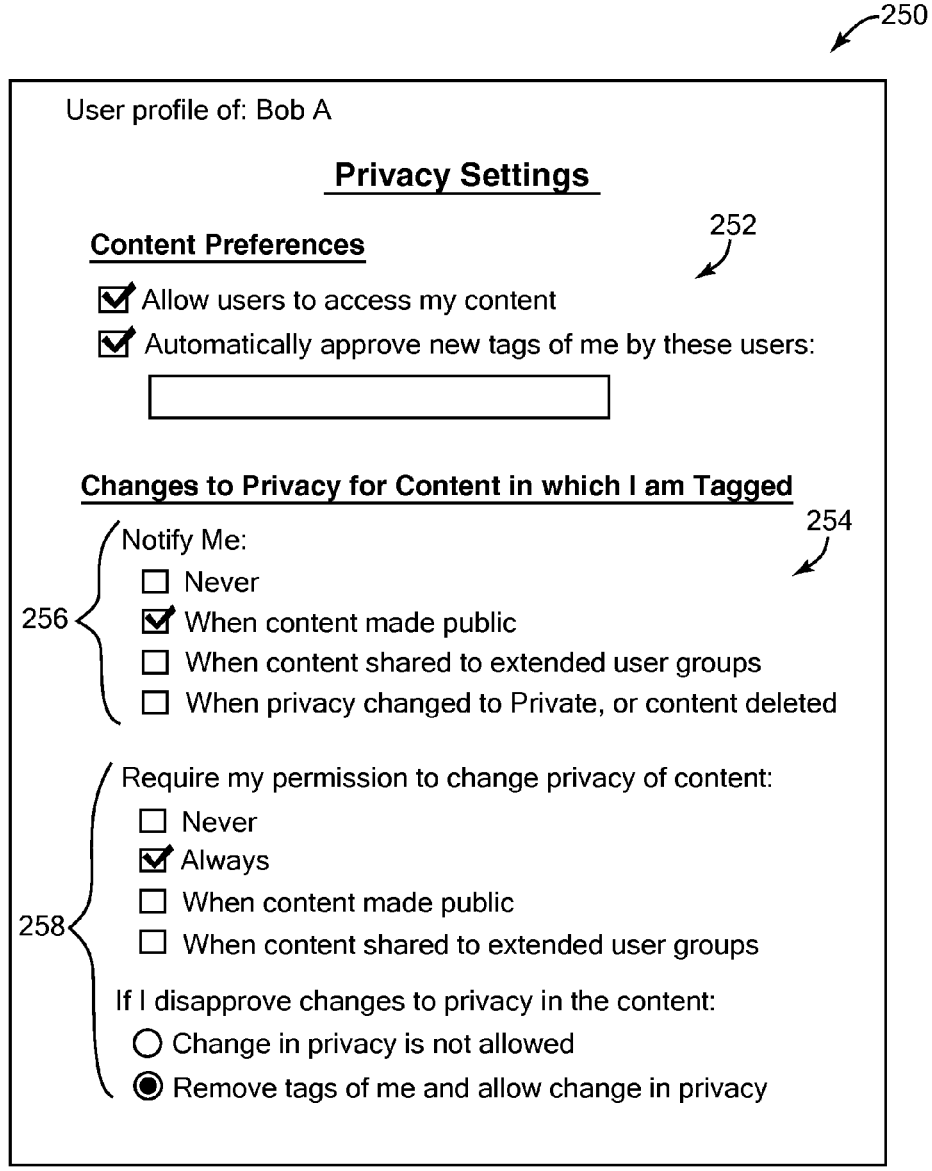
FIG. 4 is a diagrammatic illustration of an example simplified GUI showing example privacy settings for a user, according to one embodiment

FIG. 4 is a diagrammatic illustration of an example simplified GUI 250 showing example privacy settings for a user to cause events based on changes of user access to shared content, according to one embodiment. GUI 250 can be part of the GUI 200 of FIG. 1 and displayed on a client device 120, 122, 124, and/or 126, for example.

The privacy settings provided by interface 250 include content preferences 252. These preferences can include such settings as allowing other users to access uploaded or posted content, and/or a setting to automatically approve new tags or other referring information created by specified other users in content.

Interface 250 also includes settings 254 for indicating notification and permission preferences for the user that are related to changes in user access (e.g., privacy level) of shared content in which the user is referred to (e.g., tagged). Notification settings 256 allow a user to designate if and how the user wishes to be notified when changes in user access are instructed for content in which the user is referred. In the example shown in FIG. 4, such settings include never to be notified, always to be notified, or to be notified in specific circumstances such as when content is instructed to be shared to extended user groups (e.g., second linked level or greater users, friends of friends, etc.), or when user access is reduced, e.g., changed to private or the content is deleted or removed from the network system.

Permission settings 258 allow a user to designate if and how the user will be prompted for permission or approval to allow or disallow a change in user access of referring shared content. In the example shown in FIG. 4, such settings include a requirement to never require permission, always require permission, or require permission in designated circumstances. In this example, such circumstances can include the referring content becoming public or increasing access to extended user groups. The settings 258 can also include preferences as to the particular changes in user access or the content which the user will allow if the user disapproves of the changes. For example, the user can select to disallow the instructed change in privacy level if the user denies permission, or the user can select to remove the referring information that refer to the user (such as tags) and then allow the change in privacy level to be made.

In some embodiments, some or all of these settings can also or alternatively be provided as selections or options in a prompt to a user that is sent to the user each time an appropriate change in user access is instructed for referring content.

Figure 5:
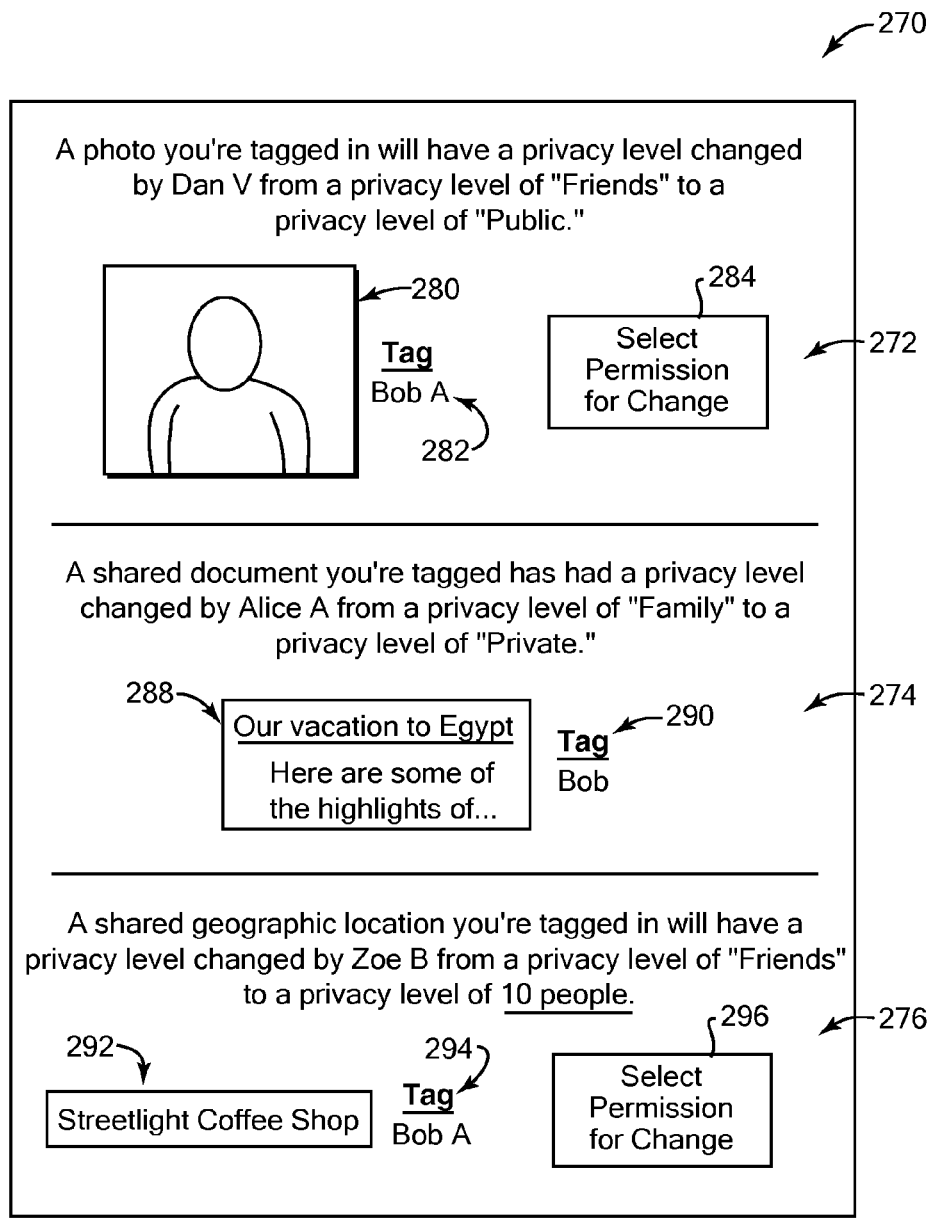
FIG. 5 is a diagrammatic illustration of an example simplified GUI showing example notifications received by a user who is referred to in shared content, according to one embodiment.

FIG. 5 is a diagrammatic illustration of an example simplified GUI 270 showing example notifications received by a referred user who is referred to in shared content that has been instructed to change its user access, according to one embodiment. In this example, a user has received three notifications and/or prompts 272, 274, and 276 which indicate instructed changes to user access (e.g., user access levels or privacy levels) for shared content referring to the user.

In a first notification 272, the referred user is notified that an uploading user, "Dan V," has instructed to change the user access level of shared photo content, where the user viewing the GUI 270 is the referred user who is tagged in the shared content. In this example, the tagged user "Bob A" is notified of the change in privacy level in notification 272, and can also be shown the particular subject content, which is this example is photo 280. In some embodiments, the notification also shows the particular referring information in the shared content 280, such as a tag 282 that provides the name of and/or link to the referred user. The notification can also indicate the particular change in privacy level, which in this example is an increase in user access from "Friends" of Dan V to "Public." In addition, if the referred user has set his or her privacy settings to require his or her permission for the change to occur to this shared content, then a control 284 can be displayed to prompt the user to grant or deny permission (e.g., approve or disapprove) the change in user access. One example of a permission interface allowing such approval or disapproval is described below with reference to FIG. 6.

In a second notification 274, the referred user "Bob A" is notified that a different user "Alice A" has instructed shared text or document content to have its user access level changed, where the text content refers to the user viewing the GUI 270. The referred user's name may be identified in the text content, for example, and/or the referred user's profile or other information may be linked by the text content. The notification indicates the particular change in user access, which in this example is a reduction in user access level from "Family" to "Private." As in notification 272, the shared content can be displayed for reference in the notification, which in this example is a beginning excerpt and link 288 of the text content which can be selected for a full view of the content. The referring information can also be displayed, e.g., as a tag 290. In this example, there is no display of a control to provide permission for the change, because the user's privacy settings have indicated that this particular change can be made without permission by the user (only requiring notification). For example, the user may have designated that a reduction in user access level is always permitted, and/or that user access changes to content having a text type is always permitted. Thus, in some cases, the change in user access may have already been made by the network system.

In a third notification 276, the referred user "Bob A" is notified that a different user "Zoe B," has instructed shared location content to have its user access level changed, where the location content refers to the referred user. In one example, the location content can be a geographical location that indicates where one or more users currently are located, e.g., based on locating a portable device carried by the user(s) or a manual input of the location. The notification indicates the particular change in privacy level, which in this example is a change in user access from all "Friends" of Zoe B to ten particular people (such as ten users of the social network system). In some embodiments, the user can click on the "10 People" text as a link to access a view of the 10 people as well as links to their profiles, if applicable. The location can be displayed as text 292, and/or a map (not shown) can be displayed showing the location. A tag 294 can also indicate the referring information at the location. A control 296 can be displayed, prompting the user to approve or disapprove the change in user access. One example of a permission interface is described below with reference to FIG. 6.

In other embodiments, other information can be included in notifications, such as links to the access-changing user's information or profile, additional information about the shared content and/or the new user access level, etc.

Figure 6:
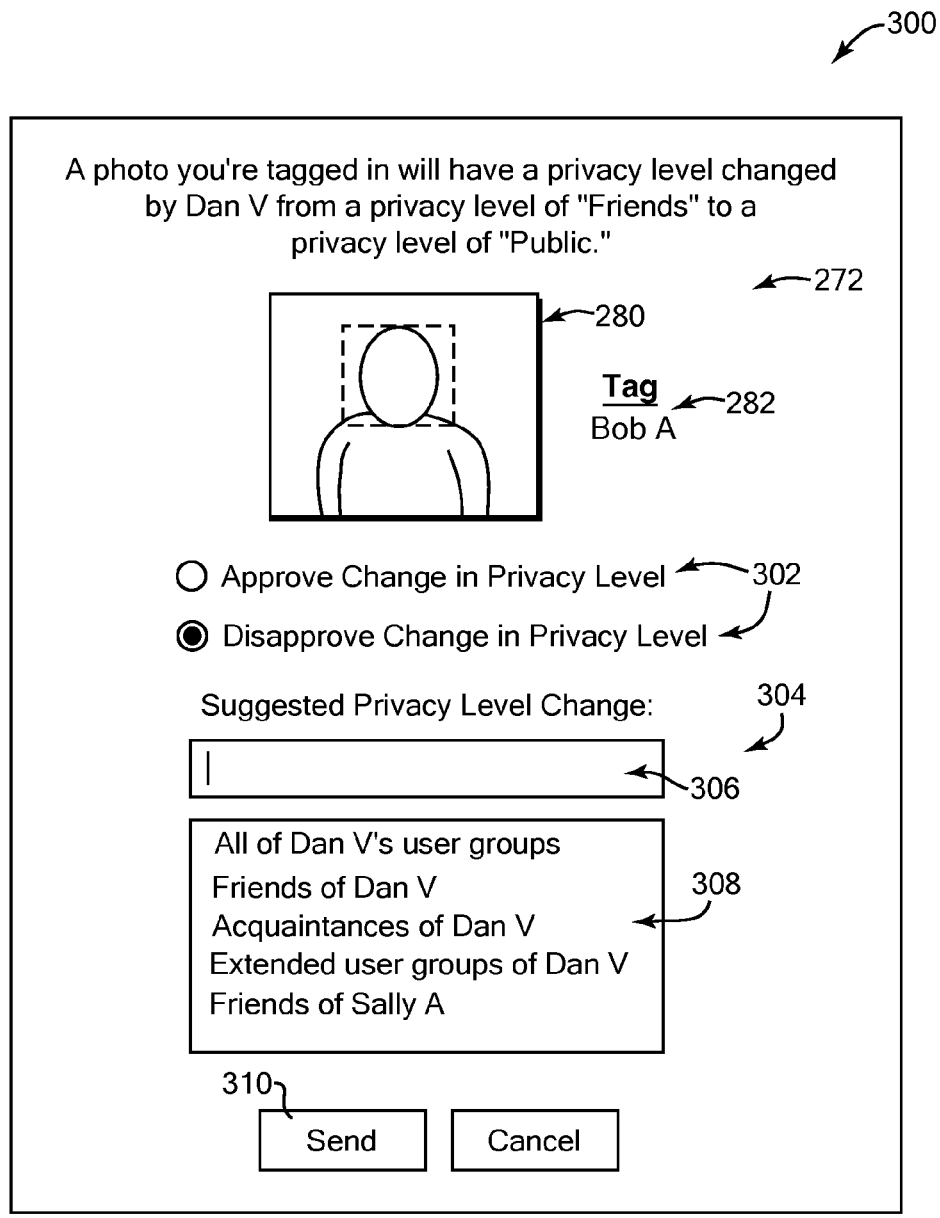
FIG. 6 is a diagrammatic illustration of an example simplified GUI showing an example permission interface allowing a referred user to approve or disapprove changes in users access, according to one embodiment.

FIG. 6 is a diagrammatic illustration of an example simplified GUI 300 showing an example permission interface allowing a referred user to grant or deny permission (approve or disapprove) changes in users access to the referring shared content, according to one embodiment. In this example embodiment, a user has selected a permission control in a notification, such as control 284 shown in FIG. 5, to cause the GUI 300 to be displayed on the client device. In this example, the interface 300 can include the notification 272, including the content of photo 280 and tag 282 that have been instructed to be changed in user access.

Interface 300 includes permission selections 302, which in this example include an approval and a disapproval. Selecting the approval indicates that the user approves of and will grant permission for the change in user access, while selecting the disapproval indicates the opposite. In some embodiments, if the user selects the disapproval response, then suggestion options 304 can be enabled. For example, the referred user can designate a suggested change in user access level that the referred user would be satisfied with instead of the change in access instructed by the access-changing user. In the example shown, the user can enter a suggestion in the field 306 or can select a suggested access level from a menu 308. In some embodiments, the menu options can be similar to options when first designating the privacy level of content, an example of which is described above for FIG. 3. In this example, the options are presented in terms of user groups for the access-changing user ("Dan V" in this example) rather than the referred user ("Bob A" in this example). In addition, user groups associated with users in the referred user's user groups can also be displayed as options. For example, a Friends user group "Sally A" is shown in options 304, where "Sally A" is a user in a user group of the referred user. Furthermore, in this example, the "Public" option is not presented in menu 308 since the user has already selected to disapprove of the change in user access level to "public" in selections 302.

Furthermore, a denial of the change may cause different effects depending on the referred user's privacy settings. For example, the user may have set his or her settings to disallow the change in user access. Or, the privacy settings may allow the change in user access for the content except for the tag or other referring information pertaining to the referred user. These and other examples are described below.

A send button 310 can be presented in the permissions interface 300 to send the approval or disapproval to the access-changing user and the server to cause the appropriate action to be performed, such as changing the access level or the content in accordance with the referred user's response. Some embodiments can require further input by the access-changing user, as described for some embodiments below.

Other embodiments can present different information and/or options for the referred user. For example, in some embodiments a referred user can select a suggested user access level from a wide variety of different displayed suggestion options. In one example, a user can select a suggested access level to be one or more user groups (such as a "Friends" group) associated with any selected user of the social network system, or a combination of user groups associated with multiple selected users of the system. Some of the other possible options are described in various embodiments herein.

Figure 7:
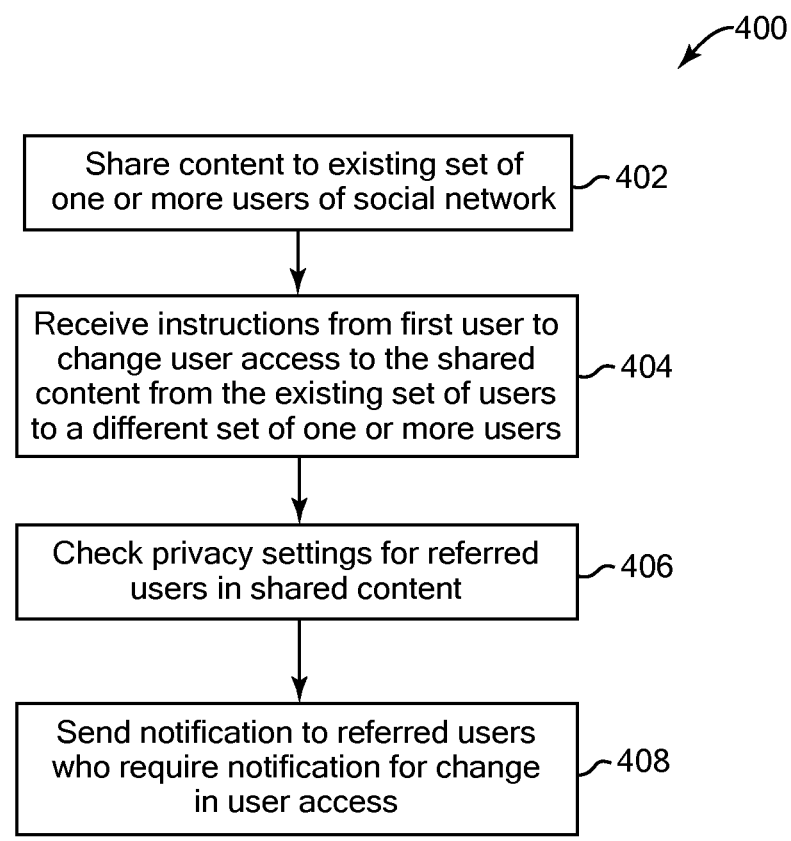
FIG. 7 is a flow diagram illustrating an example method of enabling privacy features for changes of access to shared content, according to one embodiment.

FIG. 7 is a flow diagram illustrating one example of a method 400 of enabling privacy features for changes of access to shared content. In some embodiments, method 400 (and method 420, below) can be implemented, for example, on a server system 102 as shown in FIG. 1. In described examples, the server system includes one or more processors or processing circuitry, and one or more storage devices such as a database 106. In some embodiments, different components of a server and/or different servers can perform different blocks or other parts of the method 400. In other embodiments, some or all of the method 400 can be implemented on one or more client devices. Method 400 can be implemented by program instructions or code, which can be implemented by one or more processors, such as microprocessors or other processing circuitry and can be stored on a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. Alternatively, these methods can be implemented in hardware (logic gates, etc.), or in a combination of hardware and software. The method 400 can be provided as part of or component of an application running on the client device, or as a separate application or software running in conjunction with other applications and operating system.

In block 402 of method 400, content is shared on a network system, such as a social network system. The content constitutes data and can be any type of content, such as text, image, video, audio, olfactory, tactile, or a combination of these or other types. In some embodiments, the content can include real-time information such as a geographical location at which one or more users of the network system are currently or recently located. The content is stored on one or more storage devices accessible to the social network system, such as on the social network database 106. The content can be associated with a particular user who may have uploaded or otherwise obtained the content and who has shared the content with an existing set of one or more users of the social network. For example, the content may be stored in the uploading user's profile or account.

The content is "published" on the social network system and viewable (or otherwise accessible) by an existing set of users. The existing set of users who have access to the shared content is or was previously designated by one or more users. For example, the existing set of users can be the users listed in the uploading user's group of "friends." Alternatively, the uploading user may have designated one out of multiple user groups as the set of users to have access to the content, if multiple such user groups are available. In some embodiments, the uploading user may have selected particular users of the social network system to be in the existing set of users having access, e.g. from one or more of the user's user groups, from the results of a search of users in the network system, etc. In still other embodiments, one or more other users of the network system may have designated which users are in the existing set of users having access. In one example, one or more non-uploading users may have been given the ability by the uploading user to set user access to the shared content. The existing set of users can be designated as a user access level, "privacy level," or similar designation in some embodiments, such as "Public" or "Family" or "Friends."

The shared content can include base content, such as an original image, document, audio file, video sequence, or other content type uploaded by a user, as well as additional content added by one or more users of the network system after the base content was first shared. For example, the additional content can include comments, ratings, or edits for the base content or for other additional content. Furthermore, "referring information" can be added to the content, which identifies, describes, or otherwise refers to one or more users of the network system ("referred users"). In one example, images or other forms of content can be tagged with information tags that can include referring information about a user. For example, a tag may list the name of a user of the network system who is pictured in photo content associated with the tag. In some embodiments, a tag may include a link which can be selected to access an email address, profile, or account of a user of the network system. Some examples of content are described above with reference to FIG. 2.

In step 404, the system receives instructions from a user to change user access of the shared content from the existing set of users to a different set of users on the social network system. In some embodiments, the user who provides these instructions, referred to as an "access-changing user" herein, can be the user who uploaded the (base) content and/or is associated with the content (e.g., the content is provided in his or her profile or account). In some embodiments, the access-changing user can be a different user of the network system who has the ability to change user access of the shared content.

In some cases, the user access is changed from a smaller number of users to a greater number of users, while in other cases the access is changed from a greater number of users to a smaller number. In still other cases, the number of users may remain the same, but the user access changes to different particular users or user groups. In some embodiments, the access-changing user also designates which user(s), user group(s), or sets of users who will have the new access. For example, the access-changing user may provide user input to the social network system that will cause a shared photo to be changed in its accessibility from one user group to a different user group of the access-changing user. Or, the user accessibility may be instructed to be changed from a user group (such as from a "friend list" or circle) to a "public" accessibility that includes all the users of the social networking system. Or, access can be changed from a first linked level user group (such as friends of the access-changing user) to a second or greater linked level user group (such as including friends of those friends). Other examples include changing the user accessibility from an entire user group to a subset of users in that group, or from multiple user groups to a subset of those user groups. In still other examples, the user can select particular users of the social network system to be in the new, different set of users having access. For example, users can be selected from one or more of the access-changing user's user groups, from search results from a search of users in the network system, etc.

One example of changing user access is described above with respect to FIG. 3, and other examples are described below with reference to FIG. 8.

In some embodiments, the instructed change in user access is a change from an existing user access "level" to a different user access level. A user access "level," as referred to herein, is a designated or named user group or set of users. For example, an access level can be designated as a predefined access level, such as "public", "friends," "circles," "family," or "all user groups" of a user. Or, an access level can be specified as a personally-named user group associated with the user. An access level is changed for content if the designated user group is changed, and is not changed if particular users are added to or removed from the designated group. For example, the user access level is not changed for content if particular users are added to the "friends" user group which has access to that content. However, this user access level is changed if it is set to "public" instead of "friends" for the content. A change of one user group to a different user group is a change in user access level.

In step 406, the privacy settings of referred users in the shared content are consulted. In some embodiments, the privacy settings can be part of the referred user's profile or account on the social network system and can be stored and accessed on the server system. A user can be assigned default privacy settings, or the user can modify the settings as desired. In some embodiments, the privacy settings can include an option for the user as to whether or not to be notified when any change to user access is instructed for content that refers to that user. Some examples of privacy settings are described above with respect to FIG. 4, and other options are described below with respect to FIG. 8.

In step 408, a notification is sent to referred users who require notification for change in user access, as determined based on the consulted privacy settings of step 406. The notifications can include various information, such as including or linking to the content that has been instructed to be changed, the referring information that refers to the referred user, the previous access level and the instructed new access level, etc. One example is described above with reference to FIG. 5.

Figure 8:
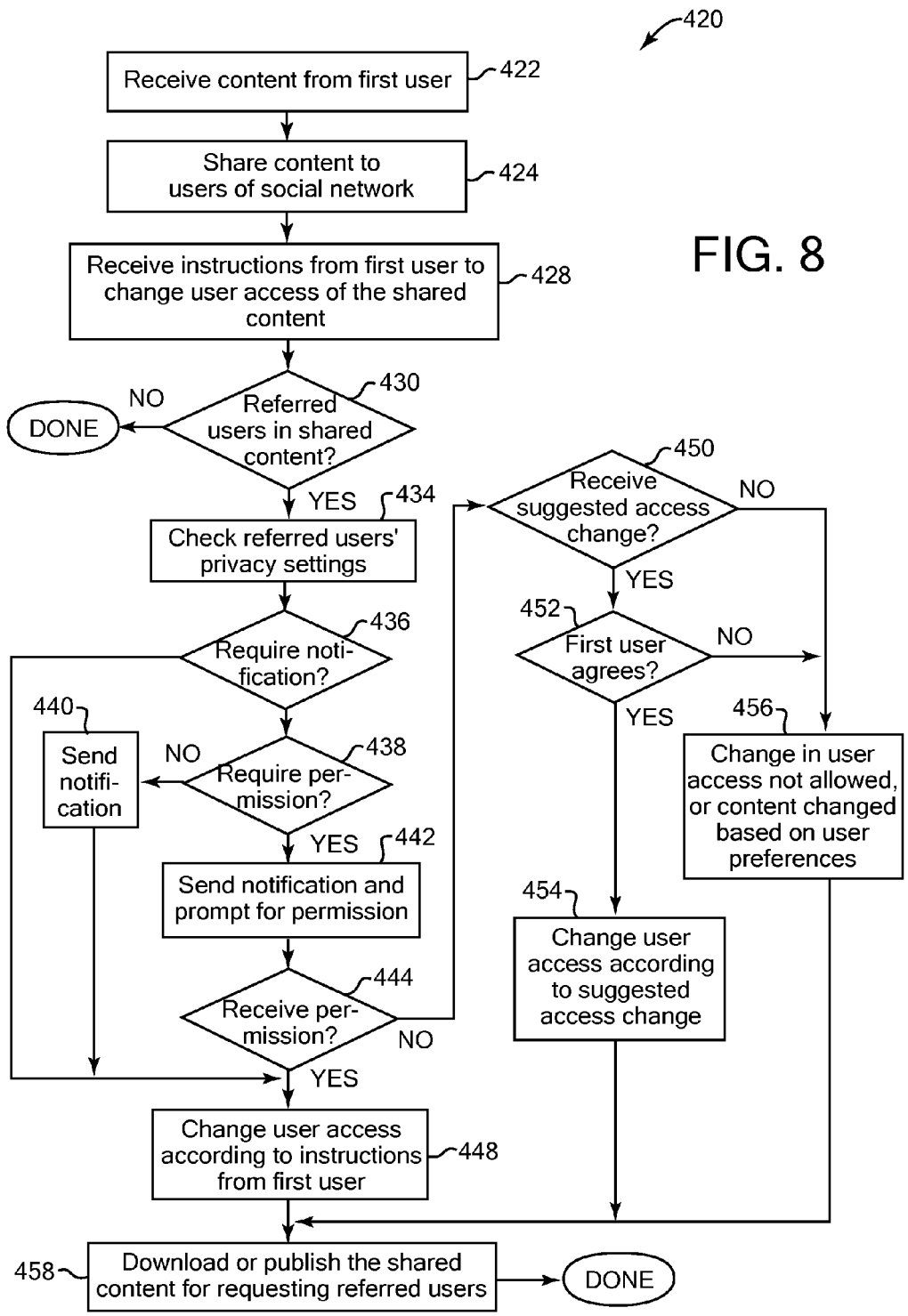
FIG. 8 is a flow diagram illustrating an example method describing additional embodiments to enable privacy features for changes of access to shared content.

FIG. 8 is a flow diagram illustrating one example of a method 420 describing additional embodiments of features to enable privacy features for changes of access to shared content. Method 420 can be implemented on software and/or hardware systems similarly as described for method 400 of FIG. 7.

In block 422, content is received by the network system, such as a social network system. As described above, the content constitutes data and can be any type of content. In some embodiments, an uploading user of the network system can upload the content from one of the client devices 120-126 to the server system 102 of the social networking system. For example, an image can be a photo that is uploaded by a user. In other embodiments, the content can be received from other server systems or other sources. Some embodiments allow the uploading user to upload the content to a user profile or account associated with the first user in the social network system.

In block 424, the received content is shared to one or more (existing) users of the social network, similarly as described above in block 402 of FIG. 7. For example, the uploading user can command the content to be "published" on the social network system so that the content can be viewed by one or more other users of the system. Or, one or more other users can share the content, or the content can automatically be shared to a previously-designated set of one or more other users of the social networking system.

In some cases, the sharing of the received content of block 424 can be an initial sharing (publication) of the content to one or more other users of the social network system to allow access to user(s) other than the uploading user. In some embodiments, this initial sharing can include notifying any users referred to by the content and/or prompting such users for permission, which can be performed similarly as to when there is a change in user access to existing shared content as described herein. In some embodiments, each user can have privacy settings applied when content is initially shared to any other users to govern whether referred users are notified and/or prompted, similar to the privacy settings described below for a change in user access of shared content from one or more users to a different set of users. In some embodiments, separate and independent privacy settings can be provided for a user, where one setting governs referred user notification and prompting when content is newly shared, and a different setting governs user notification and prompting when shared content is changed in user access from one or more users to a different set of users.

In block 428, the system receives instructions from an access-changing user to change user access of the shared content from the existing set of one or more users to a different set of one or more users on the social network system. This can be similar to step 404 as described above in FIG. 7. In various embodiments, the access-changing user can be the uploading user or one or more other users.

In block 430, the process checks whether there are any referred users referred to by the shared content. If there are not one or more referred users referred to in the shared content, the process ends. If there are one or more referred users, then in block 434 the process checks privacy settings associated with each of the referred users, similarly as described above for step 406. In some embodiments, the privacy settings for each user can include an option for the user as to whether or not to be notified when any change to user access is instructed for content that refers to that user. Some embodiments can also include a setting option as to whether or not the referred user is to be prompted for permission allowing the instructed change of user access. For example, the user can designate an option to "review" the instructed change and/or the content that is the subject of the access change (including any referring or identifying information such as tags) and other pertinent information.

Other options can allow the user to designate in the privacy settings whether to be notified and/or prompted for permission in specified circumstances or under specified conditions. In some embodiments, such conditions can include instructed changes to and/or from particular user access or access level(s) (privacy level(s)). For example, the user can designate, as a general condition, to be notified and/or prompted when user access to referring content is instructed to be changed to a greater number of users, or to a reduced or fewer number of users than in the existing set of users. In some embodiments, this change in the number of users can be determined based on a change in user access level. For example, the change can be from a user group "friends" to "private" which reduces the number of users. Alternatively, if the content is instructed to be deleted from the social network system, this is a reduction in the number of users having access.

Some embodiments can allow a user to designate these conditions more specifically. For example, the user can designate to be notified and/or prompted when referring content's access level is instructed to be changed to a specific designated user access level, such as "public" (accessible to all users of the system), second linked level user groups (such as "extended" user groups or circles or "friends of friends"), "private" (e.g., one user, such as the access-changing user). Furthermore, some embodiments can allow a user to designate to be notified and/or prompted if a number of users greater than a predetermined or designated threshold number are instructed to be added to the user access of referring content. For example, the privacy settings can include a field to allow the user to input the desired threshold number. Embodiments can also allow a user to designate notification and/or prompt if the number of users is to be reduced by a number greater than a predetermined threshold number.

Some embodiments can allow a user to set to be notified and/or prompted when the user access is changed to and/or from any particular users of the system, where those particular users can be designated by the user in the privacy settings. For example, the user can designate particular users in a list such that, if access to referring content is changed or extended to those designated users, the user is to be notified and/or prompted. In other cases, the user can designate to be notified and/or prompted if the designated users are instructed to be removed from user access. Some embodiments allow the user to designate particular named user groups, such that notification and/or prompt is required when access is allowed to those designated groups or removed from those groups. For example, notification can be designated when removing user access by a user group named "Company XYZ" that includes all employees of that company.

In some embodiments, a user can designate particular shared content, or a particular type of shared content, to cause a notification and/or prompt to the user when user access is instructed to be changed for that referring content or type. This can allow user access changes without notification and/or prompt to the referred user for other shared content that refers to the user but which is set to "don't care" or undesignated in the privacy settings. In one example, a user designates to not be notified or prompted when particular photos for a company event that depict the user are instructed for user access changes. That user also designates other particular photos for a family event to cause notification and/or prompts to the referred user for user access changes. In some embodiments, one or more types of content can also be designated in privacy settings, such that, for example, a user can designate that instructions to change user access to images or photo type content will cause notifications and/or prompts to the referred user, while instructions to change access to text type of referring content will not cause such notifications and/or prompts. Other types of content can include video, audio, location, or user-defined types (such as documents, spreadsheets, files in particular format or file extension or from a particular application, etc.).

Other conditions can be specified in some embodiments. For example, a user can select to be notified and/or prompted if, in shared content referring to that user, other referring information that refers to one or more other people or users of the network system has been newly added to the shared content. For example, new tags identifying other users may have been added to the shared content that refers to the user. Similarly, a referred user can be notified and/or prompted if referring information to other users of the network system has been removed from the content, or if those other referred users have denied permission to change the user access level to the content or to their referring information.

In some embodiments, any or all of the above conditions can be designated by the user in various combinations. In any of these examples, the user can in some embodiments designate to be notified but not prompted for permission.

In block 436, it is checked whether one or more of the referred users whose privacy settings were checked in block 434 require permission from the referred user to allow the user access of the shared content to be changed. This permission option can be provided as different options or implementations in various embodiments. For example, in some embodiments, a user can designate in the privacy settings that the user must be prompted with a request for permission when referring content is to have change in user access. Some embodiments can provide the request for permission under particular conditions or circumstances, as described above.

For referred users that do not require permission, block 440 is performed, in which the system sends out notifications to these referred users. In some embodiments, the notifications can indicate the content that has been instructed to be changed, and the referring information that refers to the referred user, as in the example of FIG. 5 described above. The process then continues to block 448, described below.

If one or more of the referred users require that their permission be received for change in user access, then block 442 is performed for those users, in which a notification and a prompt for permission is sent to those users. The prompt can be a simple request, or the prompt can display additional options, such as a field or selections to allow the referred user to suggest a different user access for the shared content if the referred user denies permission, as shown in the example of FIG. 6 described above. In block 444, the system checks whether permissions have been received from the referred users who were sent prompts in block 442. For example, each referred user who was sent the prompt can select a displayed button or control that is displayed on his or her client device for the prompt, such that the client device sends back a message to the server system 102 in accordance with the selected control. In some embodiments, permission to allow the instructed user access change is considered to have been received if all referred users grant their permission. In other embodiments, permission can be considered received if a subset of the referred users grant permission. For example, a majority of the referred users, or a number of referred users over a predefined percentage threshold, can be required to grant permission for permission to be considered received.

If permission has been received, block 448 is performed, in which user access for the shared content is changed based on the instructions received from the access-changing user in block 428. For example, the user access can be changed to a different set of users, such that the new, different set of users can now access the shared content and the prior, existing set of users can no longer access the shared content (unless a member of the new set of users). The process is then complete. In some embodiments, the referred users may also have provided suggestions to the access-changing user if the referred users would prefer a different change but will still accept the instructed change. For example, a referred user may approve the instructed change but also suggest that the change in user access be extended to a greater number of users. In some embodiments, such suggestions can be received by the access-changing user with the permission that is received in block 444. Some examples of suggested changes are described below with respect to blocks 450-454.

If permission is denied in block 444, or in some embodiments after a predetermined time period has passed without receiving any response from these referred user(s), the process continues to block 450. In this (optional) block, it is checked whether any suggested changes to user access have been received from the referred users who denied permission. In some embodiments, a referred user who receives a request for permission may provide one or more suggestions to the access-changing user as to which user access changes would be acceptable to the referred user. For example, a referred user can send a denial of an instructed user access change from "friends" of the first user to a "public" access for all system users. The referred user can also suggest a different user access change, such as from "friends" to "friends of friends," i.e., from a first linked level user group to a second linked level user group. In some embodiments, the referred user can suggest particular users in relation to the access-changing user's instructed user access. For example, if the access-changing user instructed that a user group with additional users be allowed access to the content, the referred user can suggest that only a subset of the additional users be allowed access, and can designate that subset of users in the suggestions sent to the access-changing user. Similarly, if a reduction in the number of users with access is instructed, the referred user can suggest removing user access for only a particular suggested subset of those users.

If a suggested access change has been received in block 450, then optionally block 452 can check if the access-changing user agrees to the suggested change(s) provided by the referred user(s). For example, a suggested change can be displayed to the access-changing user on an associated client device, and allow the access-changing user to respond. If the access-changing user does not agree, then the process continues to block 456, described below. If the access-changing user does agree to the suggestions, then in block 454, the user access to the shared content is changed to the suggested access change provided by the referred user(s).

In some embodiments, if there is more than one referred user who denies permission (e.g., the shared content refers to multiple users), then all of those referred users must agree to the suggested changes in addition to agreement from the access-changing user to cause the user access to change to the suggested access change. If not all the referred users agree, then the suggested change is not allowed and block 456 is performed, as described below. In other embodiments, a majority of the referred users can be required to agree to cause the access change, or a number of referred users over a predefined percentage threshold. For example, to enable easier review by all the referred users, the suggestions provided by one referred user can be sent to other referred users (to all the other referred users, or alternately to the other denying referred users) for review and acceptance/refusal by those other referred users. Some embodiments can also compare suggestions received from multiple referred users and, if all the suggestions match (or alternatively if more than a predefined percentage of the suggestions match), the suggested change in access is made to the shared content. After the suggested change in access is made to the shared content, the process continues to block 458, described below.

If the access-changing user does not agree to the suggested changes as determined in block 452 (or other condition prevents the suggested changes such as other referred users as described above), then block 456 is performed. In this block, the change in user access as instructed by the access-changing user is not allowed for the shared content, or the instructed change in user access is allowed but the shared content is changed. The particular actions performed in block 456 can depend on the embodiment, user privacy settings, etc. For example, the privacy settings of the referred user(s) may specify that when an instructed user access change is denied by those referring users, the change in user access is not allowed. In some embodiments, this can be the default result without consultation of user privacy settings or other preferences.

In other cases or embodiments, the change in user access is allowed but the content is changed in a way that is acceptable to at least the referred users who denied permission. For example, the information in the shared content that refers to the referred users can be removed before the user access change is performed. In one example, the tags associated with a photo that refer to the denying referred users are removed from the photo before the user access is changed. In other embodiments, the face of the denying referred users are blurred in an image or video as to be unrecognizable. Or, the names of the denying users are blocked out or erased in text content or audio content. Alternatively, the information referring to the denying users can be kept in the content but is not changed to the new user access, while the remaining content is changed to the new user access, thus creating different portions of the content that have different user access. This causes the denied referring information to not be visible or accessible to the new set of users, only the existing (now old) set of users. In still other embodiments, the content can be changed in other ways. For example, a link between the referring information of the content and the referred user's profile on the network system can be removed rather than removing the information itself.

In some embodiments, if there are multiple referred users and some referred users deny permission while other referred users provide permission for the change in user access, then the information (e.g., tags) referring to the referred denying users are removed from the content before the user access change is performed (or not changed in user access), while the information referring to permitting referred users is kept in the content.

The particular change in content that is performed in a particular case can also be determined by examining the referred user's privacy settings, the access-changing user's privacy settings, and/or other user preferences. For example, in some embodiments, if a change in content to be performed based on the referred user's preferences agrees with a change in content allowed by the access-changing user's preferences, the change is made. However, if these preferences do not agree, then the content is not changed and the instructed change in user access is not allowed. After block 456, the process continues to block 458.

In optional block 458, any of the referred users who wish to keep the shared content which they were notified of and reviewed for the instructed change in user access can download (or otherwise receive) and/or publish the content. For example, the shared content may have been sent to the referred users and displayed on their screen for review. One or more of the referred users may wish to download the content to their local client devices and/or publish the content in their own user profile of the social network system. Referred users may also wish to change the user access of the received content. In another example, the access-changing user may have instructed a change in user access by instructing to remove and/or delete the shared content from the social network system. In such a case, any referred users in the shared content can be sent a prompt as to whether they would like to download or otherwise receive the shared content before it has been deleted. For example, this prompt can be included in the notification of block 440 or in the prompt asking for permission as in block 442. The prompt can also request whether the referred user(s) wish to change the user access of content received in this way. The sending of the prompts can be designated by referred users in their privacy settings or other preferences, and/or the prompts can be initiated or agreed to by the access-changing user. After block 458, the process ends.

It should be noted that the blocks described in the methods of FIG. 7 and FIG. 8 can be performed in a different order than shown and/or simultaneously (partially or completely) with other blocks, where appropriate. In some embodiments, blocks can occur multiple times, in a different order, and/or at different times in the methods.

In other embodiments, variations of one or more above features can be used. For example, some embodiments may provide default conditions to cause notifications and/or prompts to be sent to referred users, those conditions determined by the social network system, website, or server. In some embodiments a user cannot change these default conditions or settings. In some other embodiments, one or more of the client devices can perform one or more functions of the server, instead of or in addition to the server performing those functions.

Figure 9:
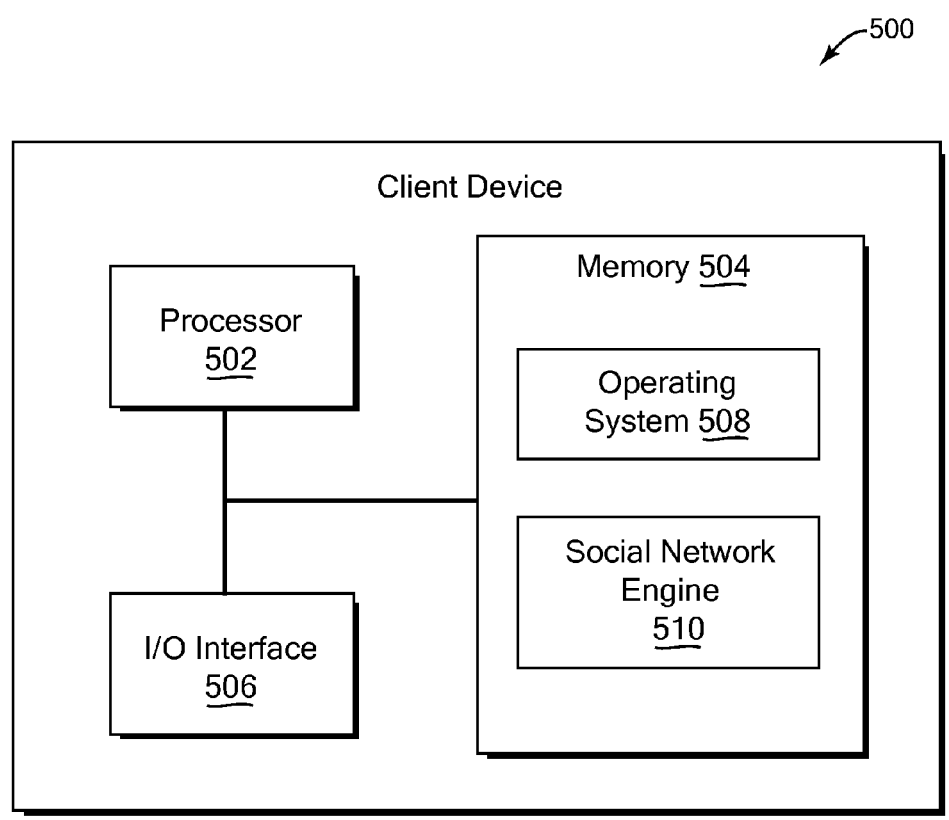
FIG. 9 is a block diagram of an example server device which may be used for one or more embodiments described herein.

FIG. 9 is a block diagram of an example server device 500, which may be used to implement some embodiments described herein. For example, server device 500 may be used to implement server device 104 of FIG. 1, and perform appropriate method embodiments described herein. Server device 500 can be any suitable computer system, server, or other electronic or hardware device. For example, the server device 500 can be a mainframe computer, desktop computer, workstation, portable computer, or electronic device (portable device, cell phone, smart phone, tablet computer, television, TV set top box, personal digital assistant (PDA), media player, game device, etc.). In some embodiments, server device 500 includes a processor 502, a memory 504, and input/output (I/O) interface 506.

Processor 502 can be one or more processors or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the server device 500 by the processor 502, including an operating system 508 and a social network engine 510. In some embodiments, the social network engine 510 can include instructions that enable processor 502 to perform the user privacy functions described herein, e.g., some or all of the methods of FIGS. 7 and 8. Any of software in memory 504 can alternatively be stored on any other suitable storage location or computer-readable medium. In addition, memory 504 (and/or other connected storage device(s)) can store privacy settings, content, and other data used in the features described herein. Memory 504 and any other type of storage (magnetic disk, optical disk, magnetic tape, or other tangible media) can be considered "storage devices."

I/O interface 506 can provide functions to enable interfacing the server device 500 with other systems and devices. For example, network communication devices, storage devices such as memory and/or database 106, and input/output devices can communicate via interface 506. In some embodiments, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 9 shows one block for each of processor 502, memory 504, I/O interface 506, and software blocks 508 and 510. These blocks may represent one or more processors or processing circuitries, operating systems, memories, I/O interfaces, applications, and/or software modules. In other embodiments, server device 500 may not have all of the components shown and/or may have other elements including other types of elements instead of, or in addition to, those shown herein. While system 102 is described as performing steps as described in some embodiments herein, any suitable component or combination of components of system 102 or similar system, or any suitable processor or processors associated with such a system, may perform the steps described.

A client device can also be used with features described herein, such as client devices 120-126 shown in FIG. 1. Example client devices can include some similar components as the server device 500, such as processor(s) 502, memory 504, and I/O interface 506. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some embodiments can provide an audio output device, such as voice output or synthesis that speaks text in ad/or describing the settings, notifications, and permissions.

As indicated above, embodiments enable privacy options to be provided to a user who is referred to in shared content on a network system. In some embodiments, a referred user can be notified of any changes in privacy level or user access for the referring shared content, whether the user access is increased from its existing level to a greater number of users, or decreased to a lesser number of users. Some embodiments allow a user to provide permission whether to allow the change in user access or not. Various privacy settings allow users to designate how they wish to be notified and provide permissions for different types of user access changes, types of content, and/or other circumstances. These features enable a user to customize how information about the user is distributed and publicized to other users of the network system. For example, a referred user may wish to be notified and given the opportunity to provide permission if another user wants to allow a larger set of users than the existing set to see a photo of the referred user, since the referred user wants to maintain privacy of photos depicting him or her to only a small set of friends or family. In another example, a referred user may wish to be notified and/or be given a permission opportunity when referring content is going to be reduced in user access, since the referred user may want the existing set of users to continue seeing that content, and/or may want to publicize referring content for publicity or marketing reasons.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art. Any suitable programming language and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some embodiments, multiple steps or blocks shown as sequential in this specification may be performed at the same time.

What is claimed is:

1. A method for enabling user privacy for content on a network, the method comprising:
   receiving input from a first user instructing at least one change in user access to shared content available over a network system, wherein the at least one change modifies the user access from an existing set of one or more users of the network system to a different set of one or more users of the network system;
   checking one or more privacy settings stored by a computer system and associated with each of one or more referred users of the network system who are referred to by the shared content, wherein the one or more referred users are different than the first user, each privacy setting selected by the associated referred user and indicating whether the associated referred user is to be sent a prompt requesting that the associated referred user provide a permission to allow the at least one change in user access to be performed;
   causing the prompt to be sent to each of the referred users who are associated with at least one privacy setting requiring the prompt;
   receiving, from at least a first referred user to whom the prompt was sent, an indication of a suggested set of one or more users for access to the shared content, wherein the suggested set of one or more users is different than the existing set of one or more users and the different set of one or more users; and
   changing the user access to the suggested set of one or more users of the network system in response to receiving permission from at least one second referred user to whom the prompt was sent other than the first referred user.

2. The method of claim 1 wherein the one or more referred users are referred to in the shared content by one or more tags associated with the shared content, wherein the one or more tags are viewable by users that have access to the shared content, and further comprising:
receiving at least one denial of permission from one or more of the referred users to whom the prompt was sent; and
performing the at least one change in user access for to the shared content except for tags of the one or more tags that refer to the denying referred users.

3. The method of claim 1 wherein the prompt provides a plurality of selectable options for each of the referred users to whom the prompt was sent, each option providing a different suggested set of one or more users to have access to the shared content,
wherein each different suggested set is different than the existing set of one or more users and the different set of one or more users.

4. The method of claim 1 further comprising:
causing the indication of the suggested set of one or more users change in user access to be sent to the referred users to whom the prompt was sent, other than the first referred user, with a request for permission to allow the suggested set of one or more users to access the shared content,
wherein changing the user access to the suggested set of one or more users of the network system is in response to receiving a second indication that at least a particular number or percentage of the referred users to whom the prompt was sent, other than the first referred user, agree to the suggested set of one or more users.

5. A method for enabling user privacy for content on a network, the method comprising:
receiving input from a first user instructing at least one change in user access to shared content available over a network system, wherein the at least one change modifies the user access to the shared content from an existing set of one or more users of the network system to a different set of one or more users of the network system;
checking and determining that there are one or more referred users of the network system whose identities are indicated in the shared content to users accessing the shared content;
checking one or more privacy settings stored by a computer system and associated with each of the one or more referred users, wherein the one or more referred users are different than the first user, each privacy setting selected by the associated referred user and indicating whether the associated referred user is to be sent a notification indicating that the at least one change in user access has been instructed; and
causing the notification to be sent to at least one of the referred users whose privacy setting requires the notification, the notification caused to be sent in response to receiving the input from the first user instructing the change in access to the shared content; and
receiving an indication of a suggested set of one or more users for access to the shared content, the indication received from at least one of the notified referred users, wherein the suggested set of users is different than the existing set of one or more users and the different set of one or more users.

6. The method of claim 5 wherein the at least one of the privacy settings associated with a referred user indicates one or more types of shared content causing notifications for that referred user, the types including images and text.

7. The method of claim 5 further comprising changing the user access to the suggested set of one or more users of the network system in response to receiving permission from one or more of the notified referred users other than the at least one notified referred user.

8. The method of claim 5 wherein the instructed change in user access is a change from an existing user access level to a different user access level, wherein available user access levels include a first linked level of users including only users having a social link to the first user, an extended linked level of users having a social link to the first linked level users, and a public access level including all users of the network system.

9. The method of claim 5 wherein at least one of the one or more privacy settings specifies one or more indicated users of the network system, and wherein the notification is caused to be sent in response to at least one of the indicated users having a change in access to the shared content based on the at least one instructed change in user access.

10. The method of claim 9 wherein the notification is caused to be sent in response to the at least one of the indicated users being included in the existing set of one or more users and net being excluded from the different set of one or more users.

11. The method of claim 5 wherein each privacy setting indicates whether the associated referred user is to be sent a prompt requesting that the associated referred user provide a permission to allow the at least one change in user access to be performed, and further comprising:
causing the prompt to be sent to each of the referred users who are associated with privacy settings requiring the prompt;
changing the user access to the different set of users of the network system in response to receiving the permission from one or more of the prompted referred users; and
modifying the at least one instructed change in user access of the shared content in response to receiving at least one denial of the permission from one or more of the prompted referred users.

12. The method of claim 5 wherein the notification provides a plurality of selectable options, each option providing a different suggested set of one or more users for access to the shared content, wherein each different suggested set is different than the existing set of one or more users and the different set of one or more users.

13. The method of claim 5 further comprising:
causing the indication of the suggested set of one or more users to be sent to one or more of the notified referred users other than the at least one of the notified referred users, the indication sent with a request for permission to allow the suggested set of one or more users to access the shared content.

14. A system for enabling user privacy for shared content, the system comprising:
a storage device storing shared content; and
at least one processor accessing the storage and operative to perform operations comprising:
receiving input from a first user instructing at least one change in user access to shared content available over a network system, wherein the at least one change modifies the user access from an existing set of one or more users of the network system to a different set of one or more users of the network system;

checking and determining that there are one or more referred users of the network system whose identities are indicated in the shared content to users accessing the shared content;

checking one or more privacy settings stored by a computer system and associated with each of the one or more referred users, wherein the one or more referred users are different than the first user, each privacy setting selected by the associated referred user and indicating whether the associated referred user is to be sent a notification indicating that the at least one change in user access has been instructed; and causing the notification to be sent to at least one of the referred users whose privacy setting requires the notification, the notification sent in response to receiving the input instructing the change in access to the shared content; and receiving an indication of a suggested set of users to have access to the shared content, the indication received from at least one of the notified referred users, wherein the suggested set of users is different than the existing set of one or more users and the suggested set of users is different than the different set of one or more users.

15. The system of claim 14 wherein at least one of the privacy settings specifies one or more indicated users of the network system, wherein the notification is caused to be sent in response to at least one of the indicated users having a change in access to the shared content that would result from the at least one instructed change in user access, and wherein the one or more indicated users include one or more users included in one or more user groups specified in the privacy settings.

16. The system of claim 14 wherein each privacy setting further indicates whether the associated referred user is to be sent a prompt requesting that the associated referred user provide a permission to allow the at least one change in user access to be performed, and the operations further comprise:

causing the prompt to be sent to each of the referred users who are associated with privacy settings indicating that the prompt is to be sent;

changing the user access to the different set of users of the network system in response to receiving the permission from one or more of the prompted referred users; and modifying the at least one instructed change in user access of the shared content in response to receiving at least one denial of the permission from one or more of the prompted referred users.

17. The system of claim 14, further comprising changing the user access to the suggested set of users of the network system in response to receiving the permission from one or more of the notified referred users other than the at least one notified referred user.

18. The method of claim 13 further comprising changing the user access to the suggested set of one or more users of the network system in response to receiving a second indication that at least a particular number or percentage of the one or more notified referred users agree to the suggested set of one or more users.

19. The system of claim 14 wherein the notification provides a plurality of selectable options for each of the notified referred users, each option providing a different suggested set of users to have access to the shared content, wherein each different suggested set is different than the existing set of one or more users and the different set of one or more users.

20. The system of claim 14 wherein the operations further comprise:

causing the indication of the suggested set of one or more users to be sent to one or more of the notified referred users other than the at least one notified referred user, the indication sent with a request for permission to allow the suggested set of users to access the shared content; and changing the user access to the suggested set of users of the network system in response to receiving a second indication that at least a particular number or percentage of the one or more notified referred users agree to the suggested set of users.

* * * * *